United States Patent [19]
Friedman et al.

[11] 3,865,955
[45] Feb. 11, 1975

[54] COMMINUTED MEAT PRODUCT STABILIZED WITH JICAMA

[75] Inventors: Herman H. Friedman, Bayside; David A. Lysak, Ossining; John Hornyak, Yonkers, all of N.Y.

[73] Assignee: General Foods Corporation, White Plains, N.Y.

[22] Filed: Nov. 9, 1973

[21] Appl. No.: 414,552

Related U.S. Application Data

[63] Continuation-in-part of Ser. No. 130,800, April 2, 1971, abandoned.

[52] U.S. Cl. .................. 426/142, 426/145, 426/205, 426/212, 426/227, 426/331, 426/324
[51] Int. Cl. ............................................... A23b 1/00
[58] Field of Search ........... 426/129, 142, 145, 146, 426/147, 205, 212, 227, 324, 331, 371, 372, 426/513, 517, 519

[56] References Cited
UNITED STATES PATENTS

| | | | |
|---|---|---|---|
| 2,785,981 | 3/1957 | Dinesen | 99/100 |
| 3,595,681 | 7/1971 | Kaplow et al. | 99/154 |
| 3,694,233 | 9/1972 | Kaplow et al. | 99/150 |

FOREIGN PATENTS OR APPLICATIONS

| | | | |
|---|---|---|---|
| 2,064 | 7/1870 | Great Britain | 99/2 |
| 3,174 | 12/1863 | Great Britain | 99/2 |
| 23,888 | 10/1903 | Great Britain | 99/2 |

*Primary Examiner*—A. Louis Monacell
*Assistant Examiner*—Curtis P. Ribando
*Attorney, Agent, or Firm*—Howard J. Newby; Bruno P. Struzzi; Daniel J. Donovan

[57] ABSTRACT

Jicama, a root vegetable, is employed as a water binding ingredient to inhibit microbial propagation in food compositions having 15–50 percent moisture. The jicama-containing food compositions are bacteriologically stable under room temperature storage conditions when packaged without recourse to aseptic conditions in moisture impermeable containers.

3 Claims, No Drawings

COMMINUTED MEAT PRODUCT STABILIZED WITH JICAMA

This application is a continuation-in-part of application Ser. No. 130,800, filed Apr. 2, 1971 now abandoned.

BACKGROUND OF THE INVENTION

1. Field of the Invention

This invention relates, in general, to foodstuffs and, in particular, is directed to foodstuffs characterized by having a 15 percent to 50 percent moisture content range and a capability of inhibiting bacteriological growth over prolonged storage at room temperatures when packaged in substantially moisture impermeable containers.

2. Description of the Prior Art

One of the outstanding disadvantages of substantially all moist foodstuffs with respect to edible quality is their proclivity to decompose upon storage due to the growth of food spoiling bacteria. This deficiency of foodstuffs of being incapable, for the most part, of maintaining bacteriological stability from the time of harvesting or processing to the time of consumption is particularly pronounced in those instances wherein the moisture content of the foodstuff is of sufficient magnitude to impart desirable textural and taste attributes. Unfortunately, for many foodstuffs, the optimum moisture content with respect to eating quality coincides with that moisture level which promotes or induces bacterial propagation.

Although the food industry has, to a large extent, overcome other inherent deficiencies of foodstuffs pertaining to withstanding detrimental alteration during storage at room temperatures, such as those changes resulting from chemical and enzymatic reactions, attempts to inhibit bacteriological growth in the foodstuffs at ambient temperatures without degrading the flavor or textural qualities of the foodstuffs have been, prior to the conception of the instant invention, less than completely successful.

Briefly, three methods have been employed in the past to impart microbiological stability to foods stored at room temperatures — i.e., temperatures of about 50°F. to about 90°F. Dehydration and canning are well-known techniques and, although compromising on consumer acceptability with respect to organoleptic quality, these techniques have successfully inhibited bacteriological growth and have enjoyed wide commercialization.

Chemical treatment, such as salting or acidification, especially in conjunction with dehydration, has been historically an effective technique for inhibiting microbial propagation in foodstuffs. It is, however, well recognized that such chemical treatments radically alter the taste and associated qualities of the treated foodstuff.

Recently, major advances have been made to develop soft, moist foodstuffs which are bacteriologically stable over prolonged storage periods at room temperature by incorporating in the food formulation certain chemical compounds which have the capability of "binding" the moisture present to produce an effect equivalent to an overall depletion of "free" water to a level below that which is necessary to support bacterial growth. In other words, even though the foodstuff contains an amount of moisture which imparts the desirable moist eating quality to the foodstuff and which, at room temperatures, would ordinarily sustain bacterial growth, the average energy of "binding" of the moisture is at a level which makes the water unavailable to the bacteria. The net effect, with respect to bacteriological growth, is as though the foodstuff were dehydrated to a point wherein the bacteria can, at most, merely maintain a status quo.

The principle underlying the above treatment for the inhibition of microbial propagation is usually expressed in terms of "water activity" ($A_w$) and the effect of water activity on the microbiological stability of food is comprehensively discussed in Scott, W. J., "Water Relations of Food Spoilage Microorganisms"; *Advances In Food Research VII* 83–127 (1957). The information in this treatise and that of Brockman, M. C., "Development of Intermediate Moisture Foods for Military Use," *Food Technology*, Vol. 24, (Aug., 1970) is incorporated by reference in this specification for background purposes.

Since there are limits to which foodstuffs and chemical additives can "bind" water to the extent of making the water unavailable to bacteria for their growth, it is necessary to adjust judiciously the overall moisture content of the foodstuff at the time of packaging to a level such that the "free" water available to the bacteria is minimal and insufficient for promoting propagation. Additionally, it is equally important that this level of moisture be maintained throughout the prolonged room temperature storage period of the foodstuff.

In general, the prior art has established that food products which resist bacterial growth to a satisfactory degree can be formulated at an "intermediate moisture" range — i.e., about 50 percent to a lower level of about 15 percent moisture or, in other words, a moisture range intermediate to the full moisture content of, say fresh meat or vegetables, and the moisture content of their stable counterparts dehydrated by conventional techniques.

The prior art has, by adhering to the principles set forth by Scott and Brockman (supra) and employing certain chemical solutes of water as "water binding" additives successfully developed soft, moist foodstuffs at moisture ranges of about 15 percent to about 50 percent which, when packaged under non-sterile conditions in moisture impermeable containers, manifest bacteriological stability at room temperatures over extended storage periods. In practically all instances, it has been established that the water binding chemical adjuvant must be augmented with an antimycotic material; the latter being employed to inhibit the growth of yeast and molds, which, as is well-known, will persist in hosts where moisture is well below the level necessary for bacterial propagation.

A formulation with respect to storage stability is one in which the water activity of the product is less than 0.90 and also contains an effective amount of mold inhibitor such as sorbic acid or one of its salts. As is apparent to those skilled-in-the-art, water activity in the desired range is achieved by including appropriate quantities of water soluble materials such as sugars, glycerol and glycols in the formulation of products which contain moisture in an amount between about 15 percent and 50 percent by weight based on the total weight of the product.

The soluble materials employed by the prior art, although fulfilling the intended function of maintaining the water activity of the food formulation in the proper range, have the pronounced drawback of imparting undesirable flavor, after-taste, and deleterious textural effects. Therefore, their application in significant amounts in commercial foodstuff has been limited primarily to sugar; cf Burgess, et al. U.S. Pat. No. 3,202,514.

What has apparently escaped the prior art and that which forms the gist of the present invention is the discovery that jicama, a bland tasting root vegetable having a water binding capability superior to sucrose, can be effectively employed for the complete or partial replacement of sucrose and/or other conventional water binding components in intermediate moisture foods to produce food compositions which have organoleptic advantages over the prior art products.

OBJECTS OF THE INVENTION

Accordingly, prior to the present invention, an unfilled need has existed for moist human foods and pet foods which, during room temperature shelf storage, would retain their organoleptic attributes without recourse to chemical solutes for imparting microbial stability.

It therefore becomes an object of the present invention to provide foodstuffs which resist bacteriological growth when stored at room temperatures without the need for formulating the foodstuffs with sugar, polyhydroxy alcohols, or other nonbland materials.

It is another object of the present invention to provide intermediate moisture foods which retain their excellent eating qualities over prolonged storage at room temperatures.

Another object of the instant invention is to provide intermediate moisture foods which are characterized by their natural good tasting qualities and which are free from excessive sweetness, saltiness, bitterness and objectional after-taste.

Still another object of the present invention is to provide foodstuffs which may be shelf stored and, upon consumer preparation, approach equality in taste and texture exhibited by their fresh counterparts.

Yet another object of the invention is to provide intermediate moisture foods which are comprised substantially of naturally occurring food materials.

SUMMARY OF THE INVENTION

Surprisingly, it has been discovered that the above, and additional objects, features and advantages are accomplished by formulating intermediate moisture foods with jicama.

Jicama (Exogonium bracteatum) is the edible root of a plant common primarily in Mexico and is known also as Bejuso Blanco. Jicama can best be described as a radish-like plant possessing much the same physical appearance but being quite bland to the taste.

Jicama, although substantially insoluble in water, unexpectedly has been found to have the capability of binding water to a degree whereby the water is unavailable to support bacterial growth. In fact, it has been established that jicama, when processed and employed according to the method of the invention, is superior, on an equal weight basis, in water binding functionality to some of the chemical solutes heretofore considered essential for this purpose, notwithstanding their inherent organoleptic deficiencies.

Thus the present invention has fulfilled the long standing need for nutritious shelf stable foods which are moist, are good tasting, and void of the deficiencies of excessive sweetness, saltiness and/or bitterness characteristically associated with the prior art intermediate moisture foodstuffs.

In accordance with the present invention, it has been found that the excellent water binding system present in jicama can be utilized to achieve bacteriostasis in food compositions wherein the vegetable, after processing, is incorporated at appropriate levels. Also, in contrast to the prior art materials employed as water binders, the processed jicama of the invention will impart a natural flavor of low impact which is compatible with the flavors of the other ingredients forming the resultant moist product. Particularly, this relatively bland, non-sweet water binder, when present as an additive in intermediate moisture food systems, has the capability of maintaining reasonably low water activities of about 0.8 – 0.9 in the presence of moisture levels ranging from about 15 percent to about 50 percent and thereby serve to suppress the bacterial growth which would normally occur in the food compositions at these moisture levels.

In contrast to the prior art wherein water solutes such as salt, sucrose, dextrose, glycerol, and propylene glycol are employed to regulate the water activity of the processed food, the present invention is predicated on the discovery that the water binding faculty of processed jicama can be employed to effectively provide a bacteriostatic effect. The mechanism by which the processed jicama binds water, and thus makes the water unavailable for bacterial sustenance, is not clearly understood. Surprisingly, although comprised of substantial amounts of water insoluble material, processed jicama has the capability of complexing the water within its structural system to the extent that the water cannot be utilized by those bacteria usually occurring in foods. Whereas the conventional solute systems are known to dissolve in the water to form solutions which effect an osmotic pressure increase, processed jicama, because of its water insolubility must, perforce, employ a different mechanism.

It is tentatively theorized that the excellent water binding capabilities of processed jicama can be attributed to the specific confirmational macromolecular state of the dehydrated root vegetable — a state which exhibits chemical rigidity to such a high degree so as to bind and prevent water from migrating throughout the matrix of the food composition within which the processed jicama is incorporated. Such explanation, of course, is only intended as a theory as to that which is believed to occur, and the invention is not to be limited thereto. The central feature and import of the invention is the discovery that jicama when processed in accordance with the contemplated mode of practicing the present invention, can bind water to the degree that the food composition within which it is incorporated is, as a whole, microbiologically shelf stable, under prolonged room temperature storage conditions even though retaining a moisture content of 15 percent to 50 percent based on the weight of the food composition.

The salient factors of the present invention will become apparent from the description of the preferred embodiments as set forth below.

DESCRIPTION OF THE PREFERRED EMBODIMENTS

Jicama, when harvested, is obtained from the ground as a root vegetable having a thin light-to-dark brown skin covering the root flesh which is white. The flesh has a crisp texture and contains from about 70 – 80 percent moisture.

For the purposes of the present invention, the fresh jicama is cleaned, peeled and the flesh subdivided into conveniently small sized pieces for dehydration. Preferably the flesh is subdivided into cubes about one-sixteenth to one-fourth inch on edge to expose sufficient surface for effective and efficient dehydration.

The subdivided fresh jicama flesh can be effectively dehydrated in any conventional manner wherein it is subjected to relatively slow dehydration conditions. Preferably, the raw or uncooked jicama is partially dehydrated, however in some instances, it may be desirable for the prevention of enzymatic changes to blanch the vegetable material before partial dehydration.

Partial dehydration must be accomplished cautiously and at a sufficiently slow rate and only to the extent to that which does not collapse the jicama macromolecular structure. Therefore, it is within the precept of this invention that the jicama not be dehydrated to the extent that the structural system is collapsed and, in no case, should the jicama be dehydrated below about 5 percent moisture. Dehydration should take place at a sufficiently slow rate such that no part of the root vegetable is subjected to the dehydration medium to the extent its macromolecular system is reduced below about the 5 percent moisture level. Optimum dehydration of jicama for purposes of the present invention has been determined to take place in an air oven at 150°F. wherein the jicama is dehydrated to 5 – 15 percent moisture over a period of time ranging from about 10 to 18 hours.

When dried under these conditions, jicama has been determined to exhibit extremely low water activity values as shown in the following table.

Water Activity ($A_w$) of Jicama at Various Moisture Levels

| Moisture (% by wgt.) | $A_w$ |
|---|---|
| 70 | 1.0 |
| 50 | 0.9 |
| 42 | 0.8 |
| 37 | 0.7 |
| 19 | 0.3 |
| 10 | 0.1 |

As may be seen from the table, jicama at a moisture content of 42 percent exhibits an $A_w$ of 0.8 and at 50 percent moisture the $A_w$ is 0.9. As stated previously, food products having an $A_w$ of 0.9 or lower have been determined to be microbiologically stable at room temperatures. Therefore, jicama containing as much as 42 – 50 percent moisture is capable of inhibiting microbial propagation at these temperatures because the moisture is "bound" and unavailable to the bacteria.

Importantly, provided the jicama is dehydrated under conditions which do not materially alter its macromolecular structure, it is capable of absorbing water from other food components with which it is blended with it is dehydrated to a level as low as 5 – 15 percent and binding this water to an extent approximately equivalent to its dry weight in the formulation.

For example, 100 grams of jicama at 5 percent moisture can absorb 85 grams of water to yield 190 grams of jicama at 50 percent moisture having an $A_w$ of 0.9 and therefore maintain microbial stability at room temperature. Thus, if 100 grams of jicama having 5 percent moisture are blended with other food ingredients, the jicama has the capability of absorbing 85 grams of water from the other components and binding this water to the extent the jicama exhibits an $A_w$ of 0.9. If the moisture levels of the other components of the formulation are adjusted prior to blending with the 100 grams of jicama such that no more than a total of 85 grams of water is absorbed by the jicama to dehydrate them to moisture levels at which each exhibits an $A_w$ of 0.9 or lower, the entire blend of components, when packaged hermetically, will equilibrate at individual moisture levels wherein the composite exhibits an $A_w$ of 0.9 (or lower) and is microbiologically stable at room temperature. Since the jicama is uniformly blended throughout the food composition and has a moisture level approximating 50 percent, it provides a moist mouth feel to the product.

Understandably, if the jicama is partially dehydrated to a higher moisture content, say 15 percent, it does not have as great a capacity for absorbing moisture equivalent to an $A_w$ of 0.9 when blended with other food components as it does when dehydrated to 5 percent moisture.

The level at which jicama is employed in the bacteriological stable food formulation is, therefore, dictated by (1) the moisture content of the dehydrated jicama, (2) the level and moisture content of each of the other ingredients making up the food formulation, (3) the moisture content of each of the other ingredients at which it has an $A_w$ of 0.8 – 0.9, and (4) the desired $A_w$ of the packaged, moisture equilibrated food composition.

The moisture content of practically all food items is known or can be readily obtained. Also, the moisture content of food ingredients at which each exhibits an $A_w$ of 0.8 – 0.9 and is bacteriologically stable is either readily available in the literature or can be obtained by well established techniques as disclosed in U.S. Pat. No. 3,694,233.

For the bacteriological stable food compositions contemplated herein, the composite ingredients will equilibrate to moisture contents whereat the overall water activity of the packaged product is from about 0.8 to about 0.9 and preferably will be from 0.8 to 0.85. To attain this preferred level of water activity, it has been determined that for most of the applications contemplated, jicama dehydrated to a level of 5 – 15 percent moisture is required in the amount of from about 10 percent to about 50 percent by weight of the food composition.

Since equilibration of moisture, to an $A_w$ of 0.9 or less among the jicama which acts as the water binder and the other ingredients of the foodstuff is essential to achieve bacterial stability, it is necessary for the jicama to be finely ground and admixed throughout the food composition. The fact that the bland vegetable material water binder is insoluble limits its application, in this respect, to foodstuffs comprised of admixed ingredients comminuted to the extent the moisture of said ingredients is physically exposed to the water binding vegetable material. Unlike the solute-type water binders, jicama does not infuse into the other ingredients. Therefore, the maximum contact of the moisture of the foodstuff with the jicama is desirable in order to achieve rapid moisture equilibrium.

It has been determined that by subdividing all ingredients, including the jicama to a particle size ranging from about 30 mesh to about 400 mesh and preferably between 70 and 100 mesh and intimately blending all ingredients, adequate contact of the jicama with the other food components is attained and moisture equilibrium is obtained throughout the total food composition to effect bacterial stability.

In order to retain the jicama original macromolecular cellular structure, not only is careful dehydration of the root vegetable required, but it is essential that the jicama be dehydrated to the desired 5 – 15 percent moisture level prior to subdividing it to the preferred 70 – 100 mesh particle size range.

Subdividing the dehydrated jicama to the desired particle size (70 – 100 mesh) can best be accomplished in a Waring Blendor or similar equipment employing sharp blades.

The comminuted jicama can be blended with the other subdivided ingredients comprising the food composition in any of the conventional blenders wherein the mixture is exposed to relatively mild agitation, such as in a ribbon-type blender.

The finished blend is then hermetically packaged as a pulverent mix or can be reformed, as by extrusion, into attractive food pieces such as pellets, ribbons, flakes, etc., prior to packaging.

The jicama, which acts as the water binding medium in the comminuted and reformable food compositions of this invention generally does not have a soft texture. When partially dehydrated and comminuted, it attains a bland gritty taste and mouthfeel. Therefore, for those intermediate moisture foods which are intended to be of a soft, moist texture, jicama can be supplemented with other water binding agents, such as glycerol, propylene glycol and sorbitol. These supplementary water binding ingredients, in addition to augmenting the water binding effect of the vegetable materials, also impart moist mimetic effects, and lubricity to the comminuted foods.

Since the novel products of this invention, when prepared in the manner herein disclosed, are characterized by their substantially complete resistance to bacterial decomposition but can serve as hosts for yeast and mold (particularly when packaged under non-sterile conditions), the food compositions of the invention will have an antimycotic agent incorporated at a level sufficient to prevent the growth of such organisms. Sorbitol and sorbate salts, such as potassium sorbate as well as sorbic acid can be used either separately or in combination of this purpose. Other effective antimycotic agents, well known to those skilled-in-the-art may also be employed. The amount of antimycotic agent added is selected so as to produce the desired results and will constitute a minor proportion of the product, say from about 0.1 percent to about 2.5 percent of the total weight, depending on the particular antimycotic and the particular product composition, although even lower levels in the order of 50 ppm can be employed in the case of some antimycotics.

The present invention is useful for preparing products intended for human consumption such as shelf stable spreads, sausage, frankfurters and other similar comminuted and reformable food products, non-sweet jams and jellies, and filling-containing foodstuffs, such as dough-crust enclosed products. In fact, the present invention is useful for any food provided the ingredients can be comminuted to a particle size of about 100 mesh and intimately blended with the jicama water binding system to a level wherein moisture equilibration is achieved rather rapidly and under conditions where said equilibration takes place before there is bacterial propagation.

In order that the present invention may be more clearly understood, references will now be had to the following examples. In the following examples representing specific embodiments of the instant invention, all parts are by weight and it should be understood that these examples are merely meant to be illustrative and the invention is not to be limited thereto.

EXAMPLE I

Intermediate Moisture Deviled Ham

Commercial canned deviled ham, purchased at a retail store, was partially defatted by autoclaving the ham at 10 psi for 10 minutes to render a portion of the fat.

Jicama was prepared by pealing and cutting the fleshy part of the vegetable into cubes of approximately one-fourth inch on edge, drying the cubes in a hot air oven at 150°F. to 13 percent moisture, and grinding the dried cubes in a Waring blendor to a powder having a particle size of about 70 Mesh (U.S. Standard Sieve).

A 208 gram quantity of the partially defatted deviled ham was thoroughly blended with 192 grams of the powdered jicama and 1.2 grams of potassium sorbate. The mixture was ground in a large mortar and uniformly dispersed and then divided into 50 gram portions which were placed in covered glass jars and stored at room temperature. The moisture content of the mixture was 43 percent by weight, measured by the vacuum oven method at 105°C. and the $A_w$ of the mixture was determined to be 0.81.

After two months storage at room temperature, the samples were evaluated and found to be tasty and otherwise organoleptically satisfactory and to have no indication of microbial spoilage.

EXAMPLE II

Intermediate Moisture Luncheon Meat Product

A luncheon meat product was prepared containing the following ingredients:

| INGREDIENT | AMOUNT | |
|---|---|---|
| | GRAMS | % BY WEIGHT |
| Ground Ham (Boiled) | 330.00 | 53.46 |
| Salt | 18.00 | 2.92 |
| Propylene Glycol | 12.30 | 1.99 |
| Potassium Sorbate | 1.230 | 0.20 |
| Dried Egg White (Henningsen's) (P-600) | 30.00 | 4.86 |
| Gelatin (Grocery Grade) | 6.00 | 0.97 |
| Quar Gum (Stein Hall A-20-A) | 3.00 | 0.49 |
| Emplex (Patco Products) | 3.00 | 0.49 |
| Bacose (General Mills) | 76.20 | 12.34 |
| Potassium Nitrate | 0.18 | 0.03 |
| Sodium Nitrate | 0.18 | 0.03 |
| Sodium Ascorbate | 0.72 | 0.12 |
| Jicama[1] | 136.80 | 22.16 |

[1] The jicama was prepared as in Example I having 12% moisture and an average particle size equivalent to 40 Mesh (U.S. Standard Sieve).

The ham and propylene glycol were blended to a paste in a Hobart mixer for 5 minutes. The propylene glycol was found to be useful in imparting a liquid or moist effect to the product.

The Bacose were ground in a Waring blendor and added to the ham/propylene glycol paste. All of the other ingredients were then added and blended together for 5 minutes in the Hobart mixer at speed setting No. 2. The product was then transferred to quart size glass jars, cooked in boiling water for 30 minutes, and then cooled to room temperature. The moisture content of the cooked and cooled product, as measured by vacuum oven, was 43.1 percent, and the $A_w$ was 0.83 percent.

The product had a pleasant meat flavor and although the texture was slightly dry, the product was considered acceptable and the taste panel believed it quite feasible that the slightly dry texture could have been eliminated by the addition of a small amount of a non-aqueous fluid such as glycerol or propylene glycol.

After a month's storage at room temperature, the samples showed no evidence of microbial spoilage and no significant organoleptic changes.

Upon consideration of the foregoing, it will become apparent to those skilled-in-the-art that various modifications may be made without departing from the invention embodiment herein. Therefore, only such limitations should be imposed as will be indicated by the spirit and scope of the appended claims.

What is claimed is:

1. A bacteriologically stable food composition having a moisture content of from about 15 percent to about 50 percent by weight and a water activity of about 0.8 – 0.9 consisting essentially of:
   a. a blend of one part by weight of meat normally capable of supporting bacterial growth and comminuted to a particle size ranging from about 30 mesh size to about 400 mesh size (U.S.S. Sieve), and
   b. from about one-third to about one part by weight of dehydrated and comminuted uncooked jicama, said jicama having been dehydrated to deplete it of its free water content under conditions whereat its macromolecular cellular structural system is not collapsed and its bound water content undisturbed and having then been comminuted to a particle size ranging from about 70 mesh size to about 400 mesh size (U.S.S. Sieve).

2. The food composition of claim 1 wherein the ingredients are comminuted, admixed and reformed into aggregates having shapes selected from the group consisting of flakes, ribbons, chips and rings.

3. A process for preparing a bacteriologically stable food composition having a moisture content of from about 15 percent to about 50 percent by weight and a water activity of about 0.8 – 0.9 which consists essentially of:
   a. comminuting one part by weight of meat normally capable of supporting bacterial growth to a particle size ranging from about 30 mesh size to about 400 mesh size (U.S.S. Sieve) and uniformly blending said comminuted meat with
   b. from about one-third to about one part by weight of dehydrated and comminuted uncooked jicama, said jicama having first been dehydrated to about 5 – 15 percent moisture, thereby depleting it of its free water content under dehydrating conditions whereat the macromolecular cellular structural system of said jicama is not collapsed and the jicama bound water content is undisturbed and then having been comminuted to a particle size ranging from about 70 mesh size to about 400 mesh size (U.S.S. Sieve),
   c. forming the blended ingredients, having a moisture content of from about 15 to about 50 percent by weight to the desired food product shape, and
   d. packaging the shaped food product in a moisture impermeable container.

* * * * *